Figure 1:
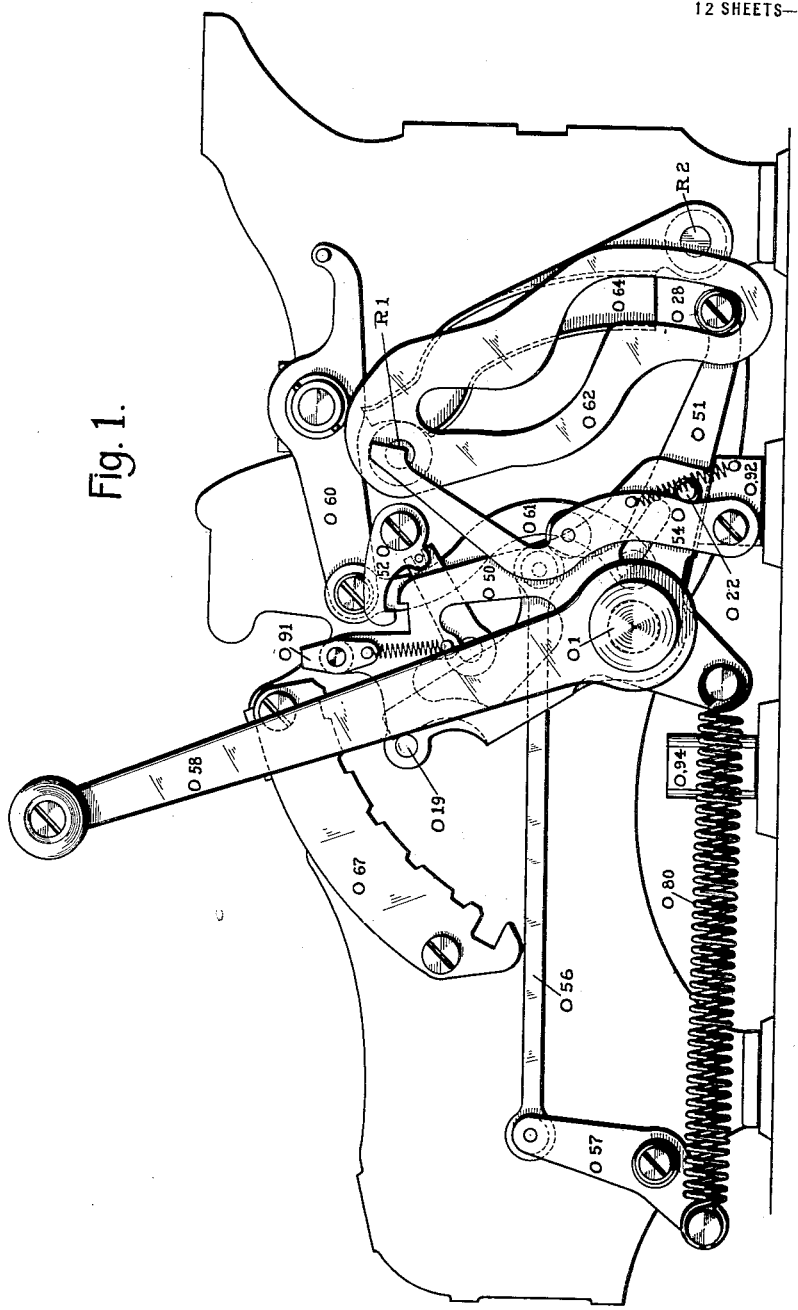

H. ELLIS.
MECHANICAL CALCULATOR.
APPLICATION FILED OCT. 13, 1914.

1,203,863.

Patented Nov. 7, 1916.
12 SHEETS—SHEET 4.

WITNESSES:
Harry A. Clarke
S. P. Lockwood

INVENTOR
Malcolm Ellis
BY
ATTORNEY

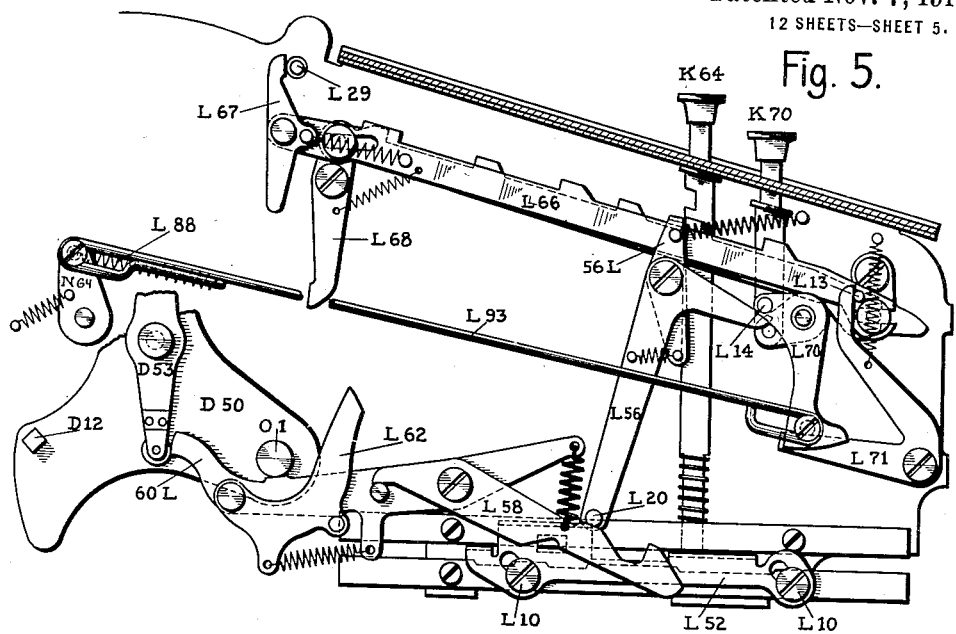
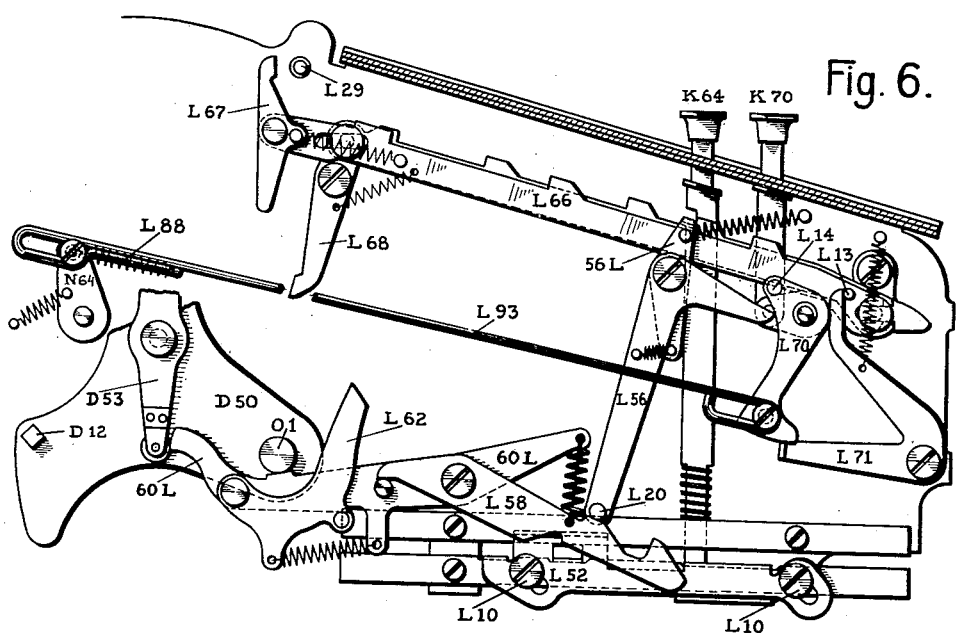

H. ELLIS.
MECHANICAL CALCULATOR.
APPLICATION FILED OCT. 13, 1914.
1,203,863.
Patented Nov. 7, 1916.
12 SHEETS—SHEET 6.
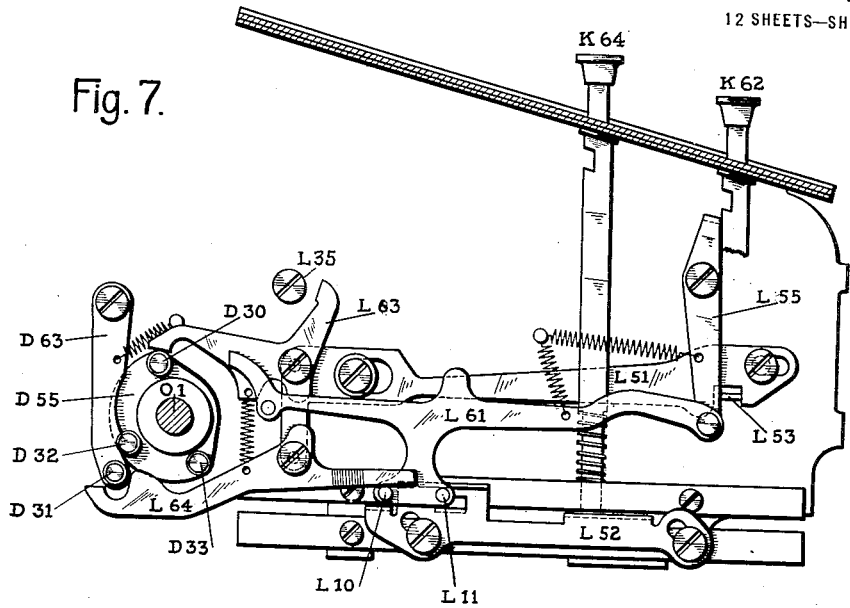
Fig. 7.
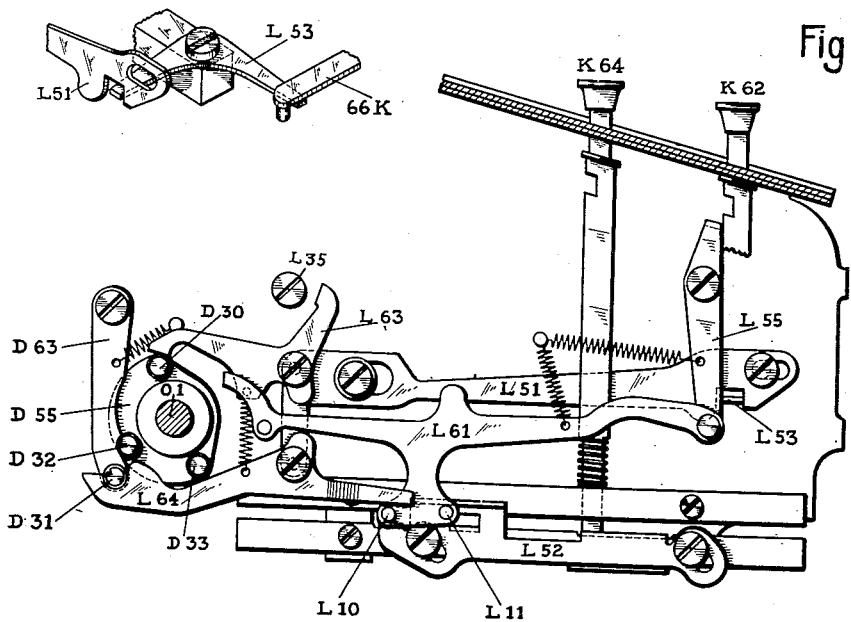
Fig. 9.
Fig. 8.
WITNESSES:
Harry R. Clarke
S. V. Lockwood
INVENTOR
Malcolm Ellis
BY
T. M. Hamlin
ATTORNEY

H. ELLIS.
MECHANICAL CALCULATOR.
APPLICATION FILED OCT. 13, 1914.

1,203,863.

Patented Nov. 7, 1916.
12 SHEETS—SHEET 7.

WITNESSES:
Harry R. Clarke
S. V. Lockwood

INVENTOR
Halcolm Ellis
BY
Geo. H. Hamlin
ATTORNEY

H. ELLIS.
MECHANICAL CALCULATOR.
APPLICATION FILED OCT. 13, 1914.

1,203,863.

Patented Nov. 7, 1916.
12 SHEETS—SHEET 9.

WITNESSES:
Harry R. Clarke
S. V. Lockwood

INVENTOR
Malcolm Ellis
BY
Geo. N. Hawkins
ATTORNEY

H. ELLIS.
MECHANICAL CALCULATOR.
APPLICATION FILED OCT. 13, 1914.

1,203,863.

Patented Nov. 7, 1916.
12 SHEETS—SHEET 10.

WITNESSES:
Harry A. Clarke
S. V. Lockwood

INVENTOR
Halcolm Ellis
BY
G. N. Hankin
ATTORNEY

H. ELLIS.
MECHANICAL CALCULATOR.
APPLICATION FILED OCT. 13, 1914.

1,203,863.

Patented Nov. 7, 1916.
12 SHEETS—SHEET 11.

WITNESSES:
Harry R. Clarke
S. V. Lockwood

INVENTOR
Haledon Ellis
BY
Geo. W. Hamlin
ATTORNEY

H. ELLIS.
MECHANICAL CALCULATOR.
APPLICATION FILED OCT. 13, 1914.

1,203,863.

Patented Nov. 7, 1916.
12 SHEETS—SHEET 12.

WITNESSES:
Harry R Clarke
S. V. Lockwood

INVENTOR
Malcolm Ellis
BY
Geo. R. Hamlin
ATTORNEY

UNITED STATES PATENT OFFICE.

HALCOLM ELLIS, OF EAST ORANGE, NEW JERSEY.

MECHANICAL CALCULATOR.

1,203,863.  Specification of Letters Patent.  Patented Nov. 7, 1916.

Application filed October 13, 1914. Serial No. 866,481.

*To all whom it may concern:*

Be it known that I, HALCOLM ELLIS, a citizen of the United States, residing in the city of East Orange, county of Essex, State of New Jersey, have made certain new and useful Improvements in Mechanical Calculators, of which the following specifications and drawings, hereunto attached, form a full, clear, and exact description.

*Class of invention.*—This machine may be classified as an adding and subtracting machine wherein a plurality of accumulators may be used at one operation of the machine, a common series of actuators used to operate as many accumulators as may be employed and each accumulator being operated for addition or subtraction without regard to which function the other accumulators may be set for, also one accumulator may be set for totals or sub-totals while the other accumulators are set for either addition or subtraction as desired.

*Object of invention.*—(1) The object of this invention is to provide an accumulator mechanism that may be operated by the rotation of the adding wheels in one direction for the purpose of addition and in the reverse direction for the purpose of subtraction. (2) To provide a tens carrying mechanism that will operate to rotate the adding wheels in one direction when adding, and in the reverse direction when subtracting. (3) To provide an accumulator capable of either addition or subtraction with a stop mechanism for limiting the travel of the adding wheels in a direction reverse to that employed in addition whenever a total or a sub-total is to be taken and to provide means for moving this limiting device on the rotation of the adding wheels whenever subtraction is to be performed.

*General description.*—The present invention is based upon and operated in a very similar manner to the machine described in my pending patent application No. 470,108, filed December 3, 1908 and which is also fully shown and described in British Patent No. 28,258 of 1908. Inasmuch as the description in the above mentioned patent is voluminous and enters into much detail, it will be unnecessary in this application to go into a fine description of many elements and details of the machine which have no direct bearing upon the accumulator or the mechanism for controlling the same.

The machine shown includes in the drawings only the calculating mechanism. The case for surrounding the machine, the carriage for holding the paper on which the printing is done; the inking mechanisms are not shown at all, they being in all respects the same as in the above application and patent referred to and could be altered to suit individual requirements if this mechanism was applied to any other machine than the one shown and described in the application and patent above referred to. The printing mechanism is only in one view in Figure 2.

Figure 2:
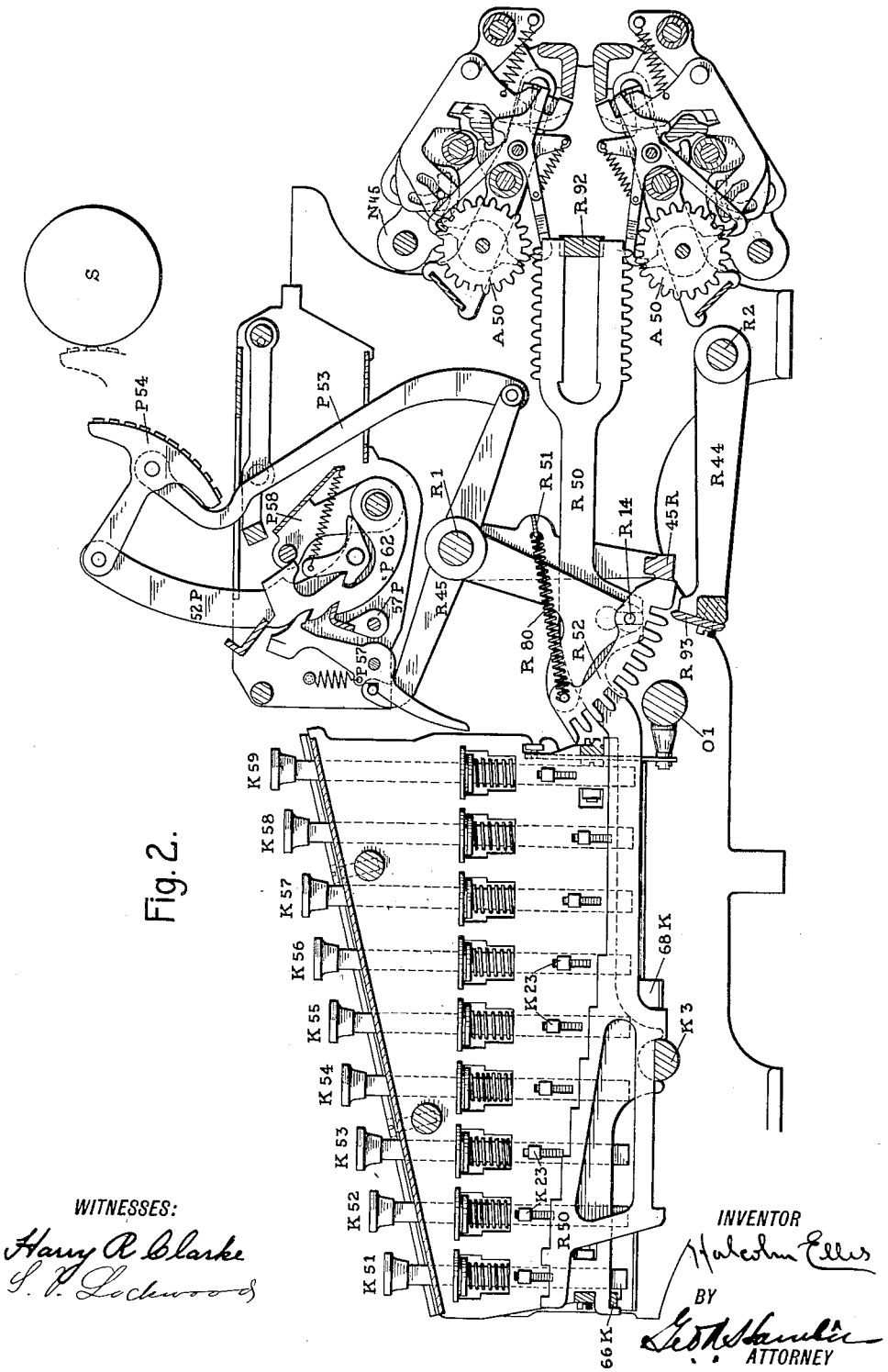

In Fig. 2, is shown a vertical center section of the machines, and illustrates my preferred method of arranging the machine as a duplex, *i. e.*, a two accumulator machine, though of course, it is evident that any other arrangement of the two accumulators could be made equally well to meet the convenience and space at the command of the designer and it is also evident that by spreading the two accumulators, with a little more space between them, it would be entirely possible to arrange, two, four or any other number of accumulators back of the two shown by extending the actuating rack straight back for the purpose of engaging such of these accumulators as might be desired. In this description but one of the accumulators and its connections will be described, and inasmuch as each accumulator has a complete set of operating keys and connections, in all respects the same as the set shown, it is evident that the second accumulator would work in all respects the same as the first.

All views shown are in the nature of diagrams with all unessential parts omitted for the sake of clearness.

Figure 3:
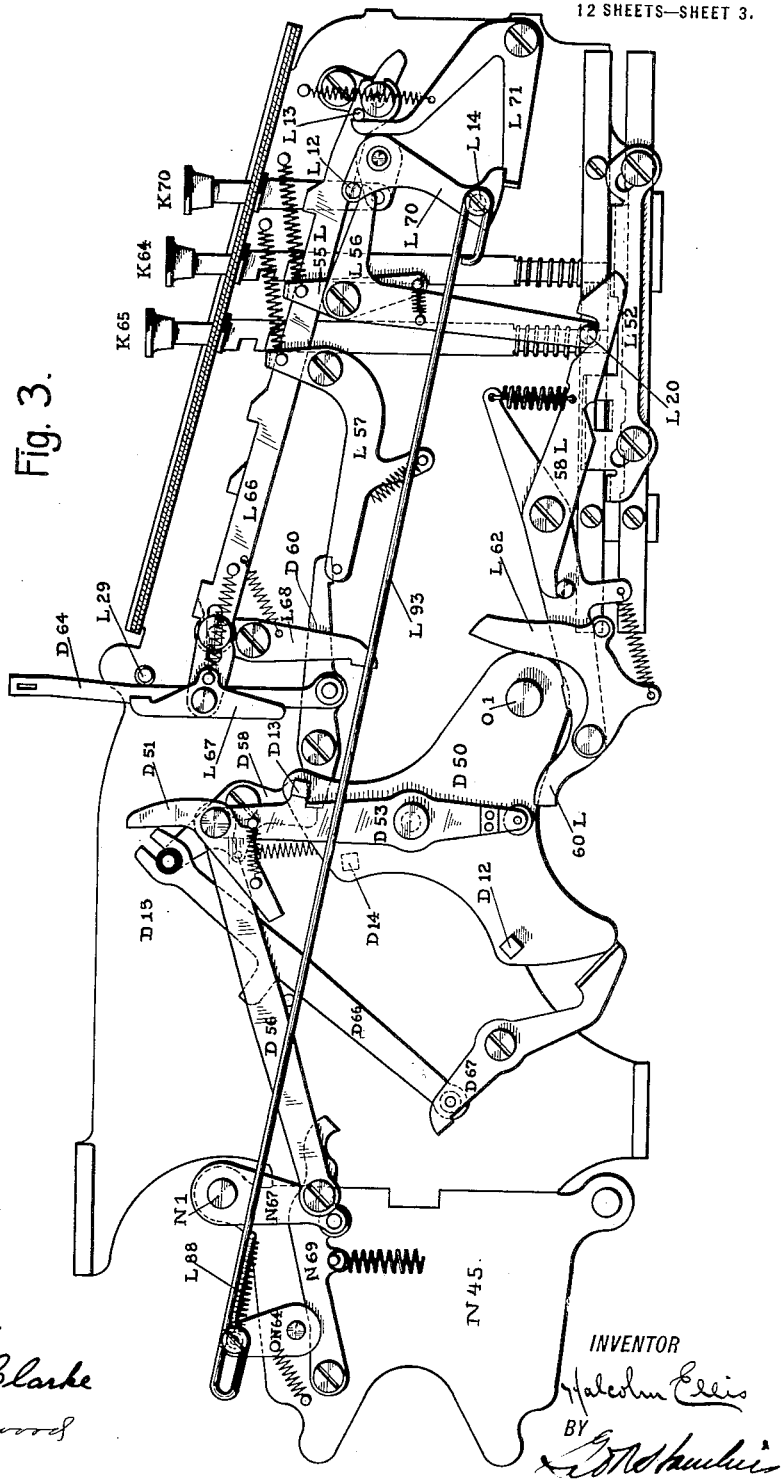
Figure 4:
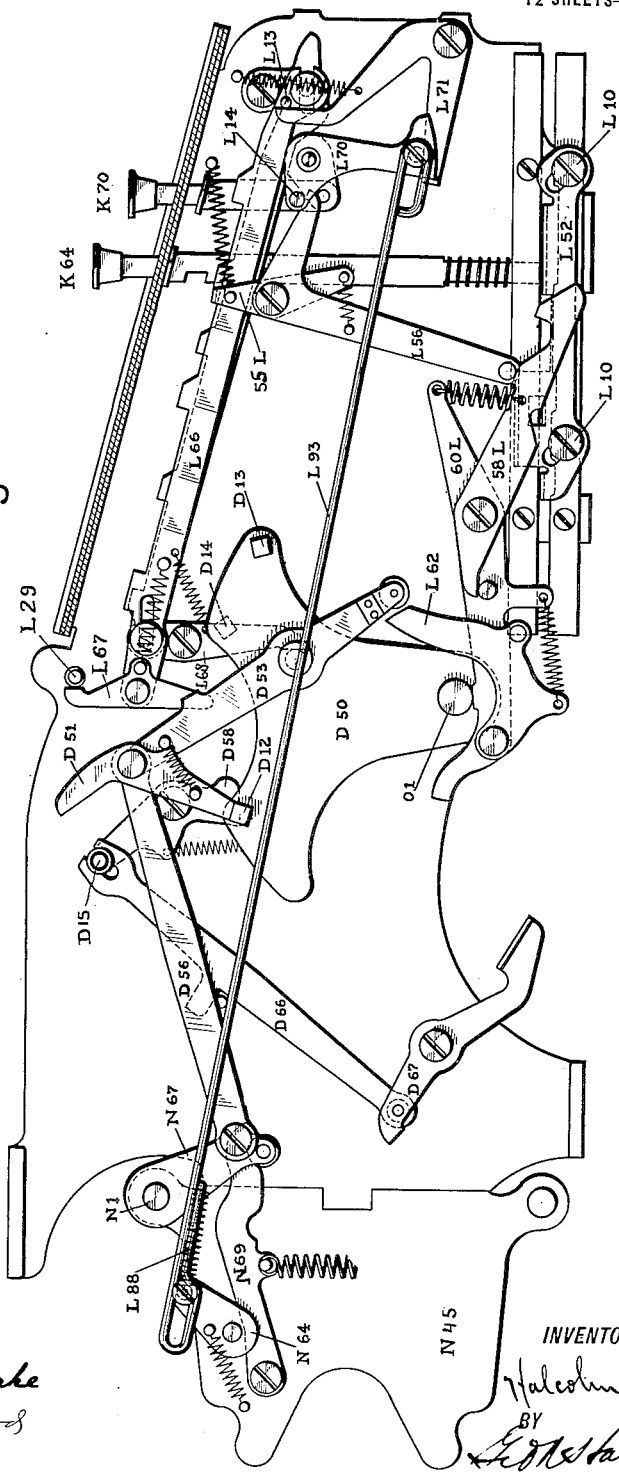
Figures 10, 11:
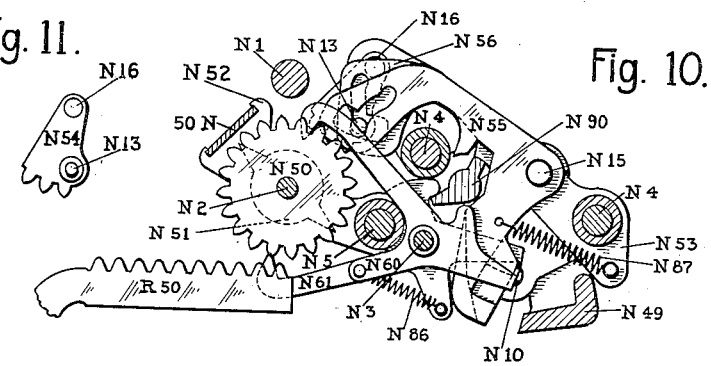
Figure 12:
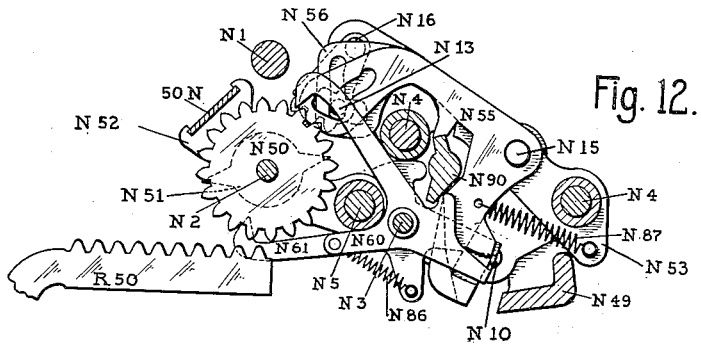
Figure 13:
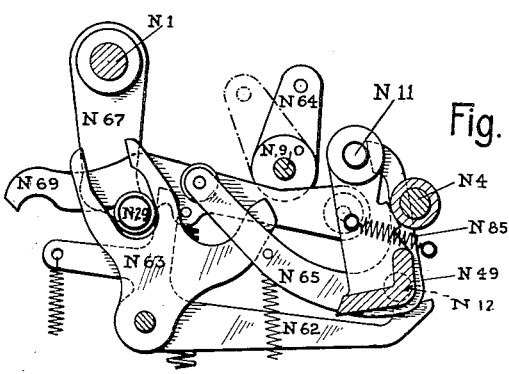
Figure 14:
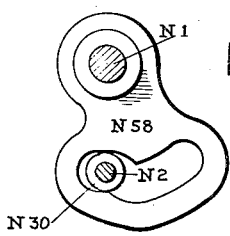
Figure 15:
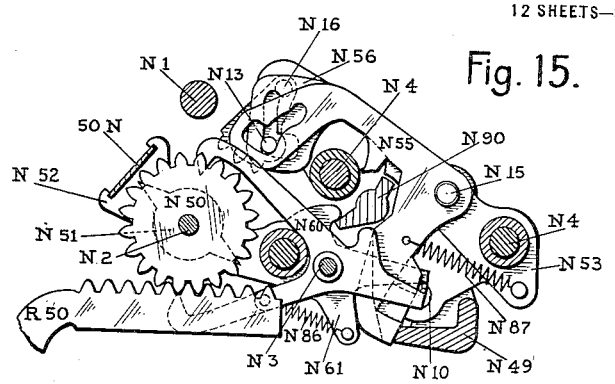
Figure 16:
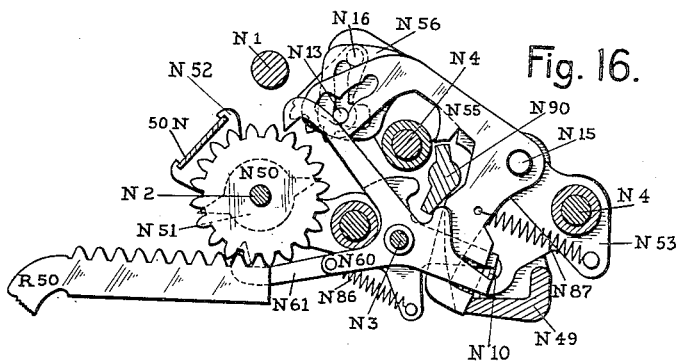
Figure 17:
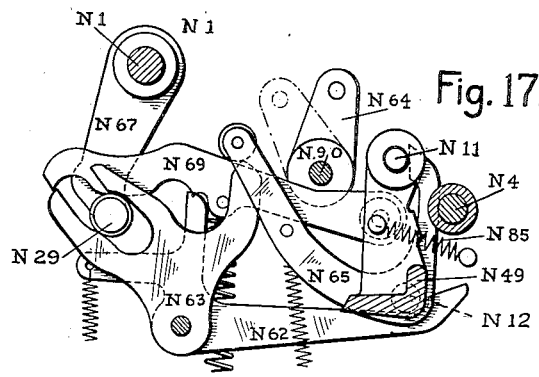
Figure 18:
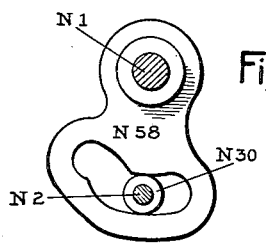
Figure 19:
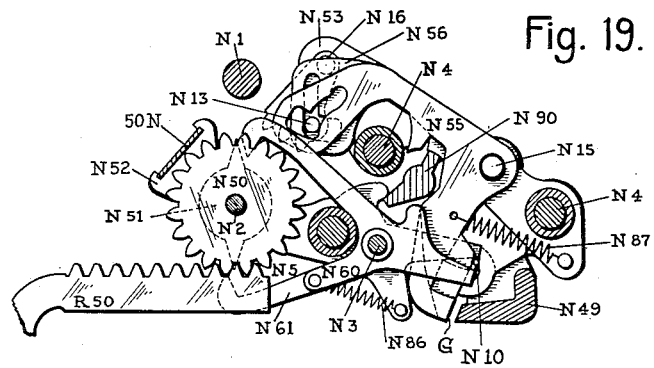
Figure 20:
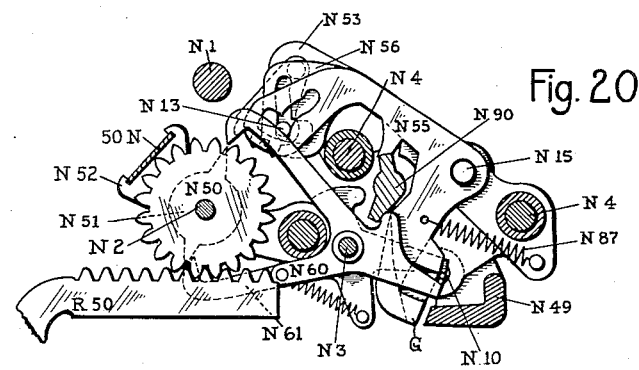
Figure 21:
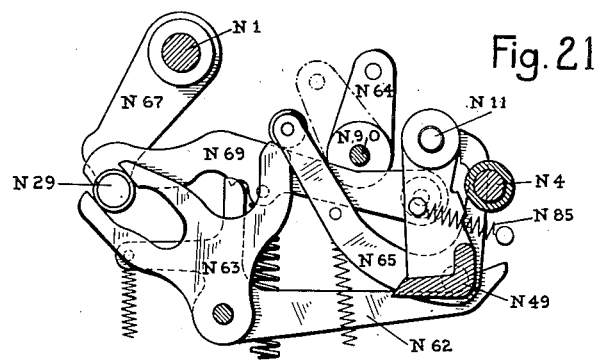
Figure 22:
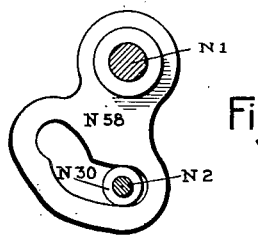
Figure 23:
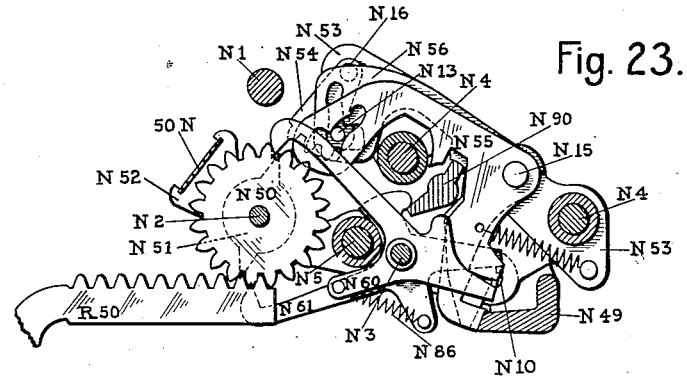
Figure 24:
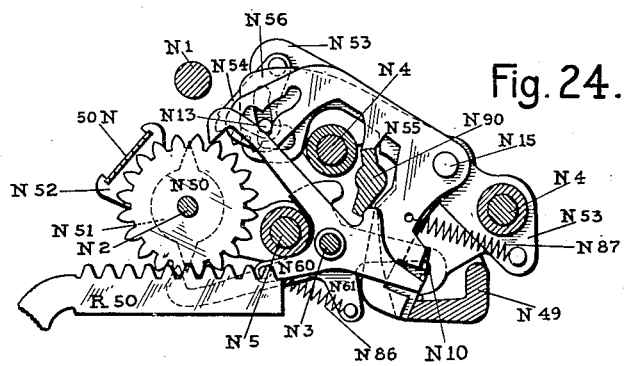
Figure 25:
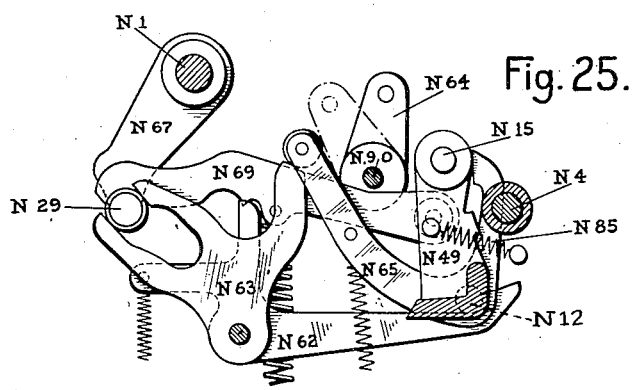
Figure 26:
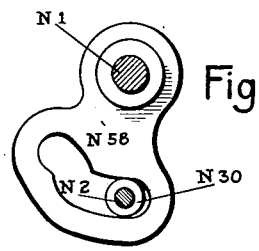
Figure 27:
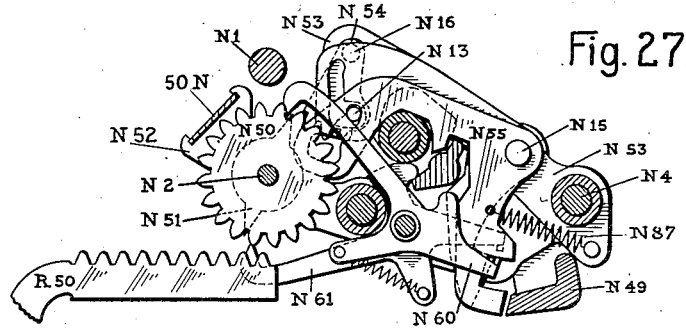
Figure 28:
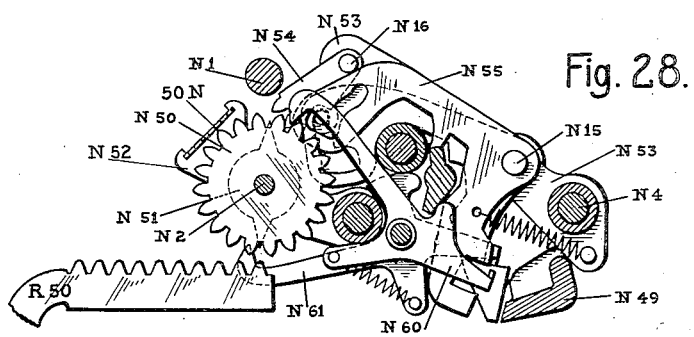
Figure 29:
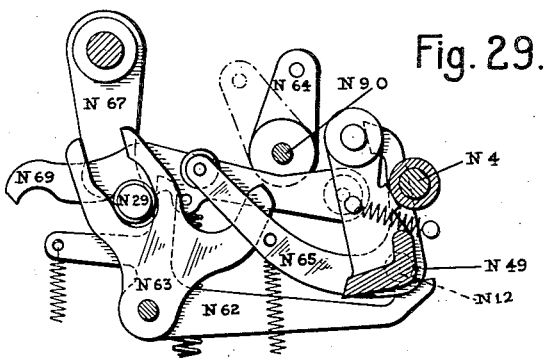
Figure 30:
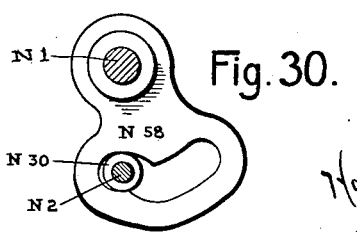
Figure 31:
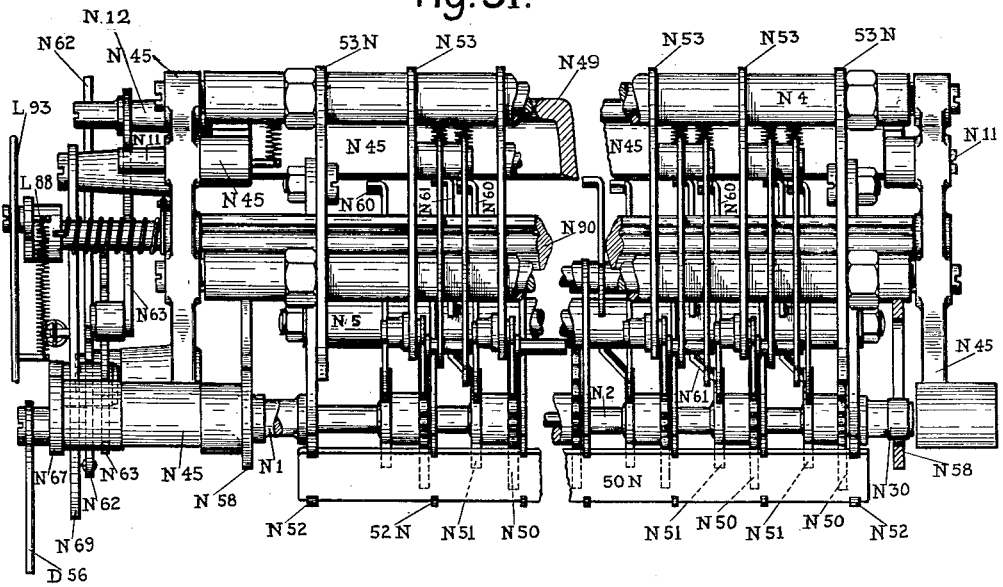
Figure 32:
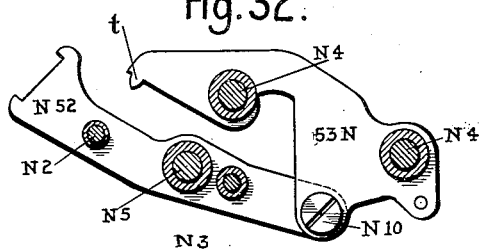
Figure 33:
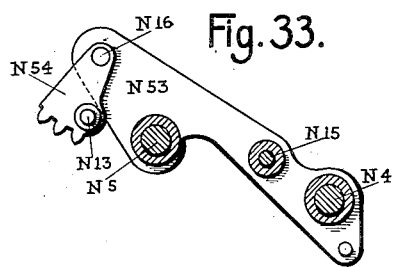
Figures 34, 35:
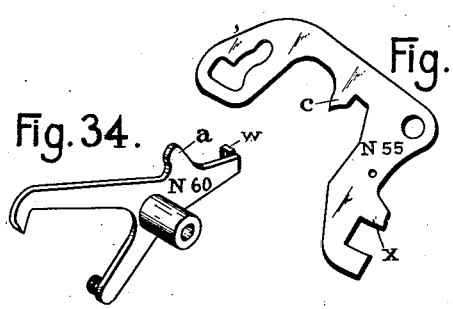
Figures 36, 37:
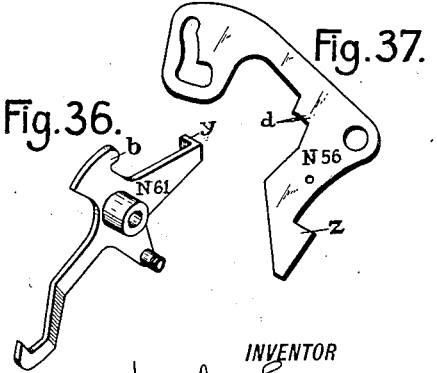

Referring to the drawings:—Fig. 1, a right side elevation showing the operating handle and the parts outside of the vertical side frame to which the cross members of the machine are attached. Fig. 2, a vertical center section showing parts of the machine in their normal position, and the relative position of the two accumulators. Fig. 3, a left side elevation with the handle in the normal position and the adding key, sub-total key and subtraction key in their elevated position. Fig. 4, a left side elevation with the mechanism in position assumed when the handle is at the end of its forward stroke, the subtraction key having been depressed. Fig. 5, a left side elevation showing the subtraction key depressed with the handle in its normal position. Fig. 6, a left side elevation showing the sub-total key depressed before the handle is moved from its normal position. Fig. 7, a left side elevation showing the numeral key release mechanism, position of the parts being normal for adding. Fig. 8, a left side elevation showing numeral key release mechanism, the sub-total key depressed and handle in normal position. Fig. 9, a detail view showing how the numeral key release bar is moved. Fig. 10, a vertical section through the accumulator, handle in normal position and accumulator set for addition. Fig. 11, detail of the carrying detent sector. Fig. 12, vertical section through the accumulator, parts in normal position with the handle at rest, mechanism set for subtraction. Fig. 13, elevation of carrying bar operating mechanism. Position normal, accumulator set for addition. Fig. 14, section showing the wheel frame cam. Position with handle normal. Fig. 15, a vertical section of the accumulator set for addition, position of parts with the carrying bar at its extreme forward position, which position is reached just prior to the handle reaching its extreme forward position when adding. Fig. 16, vertical section through the accumulator set for subtraction, parts in the same relative position as parts shown in Fig. 15. Fig. 17, elevation of carrying bar operating mechanism set for addition, position of parts same as the position shown in Figs. 15 and 16. Fig. 18, detail showing the wheel frame cam, position same as position of parts shown in Figs. 15, 16 and 17. Fig. 19, vertical section through the accumulator, parts set for addition, position of the parts that assumed when the handle is at the extreme end of its forward stroke in adding. Fig. 20, vertical section through the accumulator, parts set for subtraction, position of parts is that assumed when the handle is at the extreme end of its forward stroke. Fig. 21, elevation of the carrying bar operating mechanism, parts set for addition and position the same as in Figs. 19 and 20. Fig. 22, detail showing the wheel frame cam, position the same as for parts in Figs. 19, 20, and 21. Fig. 23, a vertical section through the accumulator, parts set for addition, position of parts that assumed when the handle is on its return stroke and the racks have completed their forward movement, but the adding wheels have not been disengaged from the racks, the carrying hook is tripped so that carrying will be performed when the wheels are brought into mesh with the carrying detent sector. Fig. 24, a vertical section through the accumulator, parts set for subtraction, position of parts that assumed when the handle is near the end of its forward stroke, the adding wheel has tripped the subtracting hook for the purpose of carrying; the wheels are still in engagement with the actuating racks. Fig. 25, elevation of the carrying bar operating mechanism. Parts set for addition and position assumed when the handle is near the extreme end of its forward stroke. Fig. 26, showing the wheel frame cam, position that assumed when the handle is near the end of its forward stroke when adding. Fig. 27, a vertical section through the accumulator, parts set for addition, position that assumed when the handle has returned to its normal position, the carrying bar released and carrying accomplished. Fig. 28, a vertical section through the accumulator, parts set for subtraction, position that assumed when the handle has reached its normal position, carrying bar released and carrying accomplished. Fig. 29, elevation of the carrying bar operating mechanism, set for addition, position of parts that assumed when the handle is returned to its normal position. Fig. 30, detail showing wheel frame cam, position assumed when the handle has reached its normal position. Fig. 31, top view or plan of the accumulator, broken through the center in order to shorten the view and showing the relative position of the operating parts and of the parts controlling the movement of the carrying bar. Fig. 32, detail showing the plate $53^N$, and the side member $N^{52}$, of the wheel frame. Fig. 33, detail showing the plate $N^{53}$ and the carrying segment $N^{54}$, mounted thereon. Fig. 34, detail of the adding hook $N^{60}$. Fig. 35, detail of the adding cam, $N^{55}$. Fig. 36, detail of the subtracting hook $N^{61}$. Fig. 37, detail of the subtracting cam, $N^{56}$.

In general, the operation of this machine is dependent upon a forward and backward movement of a sliding rack—see Fig. 2. This rack, $R^{50}$ is mounted to slide on two slotted cross bars $K^3$ and $R^{92}$. The movement of this rack $R^{50}$ backward and forward is limited for the purpose of addition and subtraction by the stops $K^{23}$ secured to the vertical sliding key stems of the keys, $K^{51}$, $K^{52}$, $K^{53}$, etc., to $K^{59}$. The key, $K^{59}$ does not limit the travel of the rack, but permits it to go its full stroke which is limited by the downward projections at the ends of that part of $R^{50}$ which slides in the groove in the bar $K^3$. These stops, $K^{23}$ are so arranged that they engage steps on the upper edge of the rack $R^{50}$ and these steps and the stops, $K^{23}$ are arranged vernier fashion so that from the first step to the first stop, $K^{23}$ on the key stem $K^{51}$, the rack $R^{50}$ could move a distance of one tooth, while stop $K^{23}$ on the second key $K^{52}$ would permit the rack $R^{50}$ to move a distance of two teeth and the stop $K^{23}$ on the key stem of $K^{53}$ would permit the rack to move a distance of three teeth, etc., up to $K^{59}$, which serves the purpose of unlocking the rack $R^{50}$, by releasing the rack lock $68^K$, and permitting the rack, $R^{50}$ to move its full travel or nine teeth.

The rack $R^{50}$ is moved in a rearward direction by means of the springs, $R^{80}$ which are connected at their rear ends to a bar, $R^{51}$, extending between the side members of a bail, $45^R$, which bail is secured to the shaft $R^1$, and rotates with it. Mounted on the shaft $R^1$, are a series of bell cranks, $R^{45}$, having three projecting arms, one projecting forward for the purpose of operating the 0 printing triggers, $P^{57}$, the other arm extending rearwardly for the purpose of connecting to the link $P^{53}$ which serves to rotate the type sector $P^{54}$ and if the bell crank, $R^{45}$ is rotated about the shaft $R^1$, the connecting link $P^{53}$ will cause the type sector $P^{54}$ to rotate about its center and bring the desired type to the printing line. The third arm from the bell crank, $R^{45}$ extends in a downward direction and carries a pin $R^{14}$ which engages a vertical slot in the lower side of the rack, $R^{50}$ so that when the rack $R^{50}$ moves forward and backward it communicates this motion to the bell crank $R^{45}$ through the pin $R^{14}$ and when the bail $45^R$ is moved to rotate toward the rear or right, in Fig. 2, the spring $R^{80}$ which connects the bar $R^{51}$ and the bell crank $R^{45}$, tends to move the rack $R^{50}$ in a rearward direction until this travel is checked by one of the stops $K^{23}$ or some other obstruction to its movement.

The segmental rack, $R^{52}$, mounted on the lower extending arm of the bell crank, $R^{45}$ is for the purpose of obtaining forced alinement of the type on the sector $P^{54}$ and this alinement segment $R^{52}$ is secured firmly to the lower arm of the bell crank $R^{45}$. The alinement of the type through the segment $R^{52}$ is brought about through the insertion of the blade $R^{93}$ mounted on the forward side of the alining frame $R^{44}$ which in turn is mounted upon the shaft $R^2$.

The rotation of the shaft $R^1$, and the rotation of the shaft $R^2$ in their proper relative time is brought about by means of a roller $O^{28}$, Fig. 1, mounted on the end of arm, $O^{51}$, which is secured to and rotates with the shaft $O^1$. This shaft, $O^1$ is rotated by means of the handle $O^{58}$ which may be moved from position shown in Fig. 1, through an angle of 60 degrees in a direction toward the left. The handle $O^{58}$ is not secured positively to the shaft $O^1$, but to a plate $O^{50}$ of irregular shape. The plate $O^{50}$ carries a small tumbler $O^{91}$ which ratchets past the teeth of a full stroke segment, $O^{67}$, and reversing at the end of the stroke, comes back to the position as shown in Fig. 1. A lower extending arm of this plate, $O^{50}$ is connected to a large spring $O^{80}$, the other end of which is connected to a pivoted arm, $O^{57}$, the upper end of which is connected to the link $O^{56}$ which in turn is connected to the upward extending part of the arm $O^{51}$.

The object of this linkage is to provide a means whereby the speed of the shaft $O^1$ may be controlled by a suitable governor irrespective of the speed at which the handle $O^{58}$ may be operated as is customary in all adding and listing machines of this class.

When the handle $O^{58}$ is moved downward it extends the spring $O^{80}$ which in turn through the lever $O^{57}$ moves link $O^{56}$ in a forward direction, see Fig. 1, and so has a tendency to move the arm $O^{51}$ in an upward direction and so cause the roller $O^{28}$ to move upward in the slot of the cam $O^{62}$ which in turn is secured to the shaft $R^1$.

It will be seen from the nature of the cam $O^{62}$, that this travel of the roller, $O^{28}$ will cause the rotation of the shaft $R^1$ through a limited arc in the reverse direction from the hands of a clock. This movement of the shaft $R^1$ causes the bail $45^R$ Fig. 2, to swing through the proper distance and so cause the springs $R^{80}$ to extend and move the racks, $R^{50}$ in a rearward direction to a possible distance equal to nine teeth. The movement of the shaft $R^1$ however, does not take place during the entire period of rotation of the shaft $O^1$, but only during the middle period of its travel. It will be noticed that the cam $O^{62}$, Fig. 1, has a portion of its length at the beginning and end of the travel of the roller $O^{28}$, concentric with the shaft $O^1$. These concentric periods will consequently permit the shaft $O^1$, to rotate while the shaft $R^1$ is remaining stationary, and thus permit other operations of the machine to take place before and after the racks $R^{50}$ have moved.

The roller $O^{28}$ has a counter part extending to the rear of the arm $O^{51}$ and this rearward roller engages the cam $O^{64}$ secured to the shaft $R^2$. This cam $O^{64}$ is so formed that the larger part of it is concentric with the shaft $O^1$ and the rearward rollers $O^{28}$ will roll in the concentric part for a distance equal to the period of travel in which the cam $O^{62}$ would move, after which the cam $O^{64}$ would be moved to the right in Fig. 1, and so rotate the shaft $R^2$ in a clock-wise direction. This rotation of the shaft $R^2$ will cause the alining blade $R^{93}$ Fig. 2, to be raised and entered in between the teeth of the segment $R^{52}$, thus bringing the position of the bell-crank, $R^{45}$ to a permanent location irrespective of the exact position of the stops $K^{23}$ or the other means of limiting the travel of the rack $R^{50}$. It will thus be seen that during the forward and return stroke of the handle $O^{58}$ the racks $R^{50}$ are moved from their position of rest as shown in Fig. 2, to the rear on the forward stroke of the handle $O^{58}$, and are returned to their normal position on return stroke of the handle, $O^{58}$, but that the racks $R^{50}$ do not travel during the entire period of the stroke of the handle $O^{58}$ in either a forward or backward direction, but only through the middle portion of the stroke of the handle $O^{58}$ in both a forward and backward direction.

In speaking of the handle stroke, it will be assumed for the purpose of explanation that the handle, $O^{58}$ will be moved at a speed permitted by the governor controlling the speed of the shaft $O^1$ so that for all purposes of explanation, the return of the handle $O^{58}$ and the shaft $O^1$ will be considered as the same in time. It is also evident that the printing type $P^{54}$ are positively connected through the links $P^{53}$ and bell cranks $R^{45}$ to the racks $R^{50}$, and that any motion of the racks $R^{50}$ will communicate a corresponding motion to the printing type $P^{54}$.

*The adding and subtracting accumulator.*—This accumulator consists of a series of toothed wheels as shown in the drawing, each wheel having twenty teeth. The wheels are mounted upon a common axis and are caused to engage and to disengage by being lifted into and out of engagement with the teeth of a sliding rack or actuator, the rack being moved a distance in number of teeth to correspond to the number of units to be added in that particular denomination. A two pointed cam with the points diametrically opposed, is secured to each tooth wheel, the function of this cam being to trip the mechanism for causing carrying and also to serve as a stop when the wheel is moved in a reverse direction from adding for the purpose of obtaining a total. A detent is provided for holding the toothed wheel from rotation when it is out of mesh with the rack, and this detent is made in the form of a small pivoted segment and so arranged that directly as the wheels are disengaged from the teeth of the rack they come into engagement with the teeth of the detent segment. Whenever a toothed wheel is rotated through a period of ten teeth and it becomes necessary to rotate the adjoining wheels one tooth in one direction in the case of addition and in the reverse direction in the case of subtraction, the holding detent segment is caused to rotate about its pivot a distance of one tooth. Suitable mechanism is provided for causing the detent segment to make this movement after the adding wheels have come into mesh with it. These same means serve the purpose of holding the detent segment stationary when carrying is not to be performed.

In my machine I prefer to assemble the accumulator as a separate unit or section of the machine and then attach this section to the balance of the machine by screws or other suitable means, having as few connection members for operating the accumulator as possible. In describing this accumulator in detail I will call attention to the arrangement of the drawings beginning with Fig. 10, and extending to and including Fig. 30.

The upper figure on each sheet represents a vertical cross section through the accumulator with the parts set for addition. The second figure of each sheet, that is, 12, 16, 20, etc., represent the same section through the accumulator with all of the parts in the same relative position in regard to the position of the operating handle, $O^{58}$, but with the accumulator set for subtraction. The third figure of each sheet, *i. e.*, 13, 17, etc., represent a vertical section through the machine showing the operating levers on the outside of the frame $N^{45}$, which serves to move the various parts of the accumulator which are not actuated by the racks, $R^{50}$ and the arrangement of the parts shown in Figs. 13, 17, 21, etc., correspond on each sheet with the position of the parts shown for the figures immediately above them. The bottom figure of each sheet, Figs. 14, 18, 22, etc., show a detail of the cam $N^{58}$, which serves to raise and lower the adding wheel, $N^{50}$, out of and into mesh with the racks, $R^{50}$. This system of arranging the figures necessitated the duplication of certain figures on the sheets, particularly such cases as Figs. 13 and 29, 14 and 30, 21 and 25, 22 and 26; but the system as a means of illustrating may make the description a little easier to follow.

The top view or plan of the accumulator section detached from the rest of the machine may be seen at Fig. 31, the center part being broken away for the purpose of bringing the two ends closer together but all the essential parts in the construction being clearly shown. There are two vertical cast iron frames, $N^{45}$ which serve as a foundation upon which the structure is erected. These frames, $N^{45}$, join on and are secured to the main side frames of the machine itself as indicated in outline in Figs. 3 and 4. Between these two side frames, $N^{45}$, there extends certain horizontal shafts, $N^4$, see Figs. 32 and 33. These shafts have collars surrounding them and the shafts pass through plates, $53^N$ and $N^{53}$; the collars serving as means for holding the plates $N^{53}$ and $53^N$ in a vertical position and the proper horizontal distance apart. There are two plates, $53^N$ which are placed one at the right-hand side and the other at the left-hand side of the group of plates $N^{53}$.

The adding wheels $N^{50}$ are mounted on a horizontal shaft, $N^2$ which extends through a series of plates $N^{52}$ and $52^N$, the end members $N^{52}$ of the series being pivoted to the plates $53^N$ at $N^{10}$, see Fig. 32. A plate $50^N$, see Fig. 31, is mortised into the ends of the pieces $N^{52}$ and $52^N$ and serves as a brace for maintaining the pieces $N^{52}$ and $52^N$ in their proper lateral position and assists in this way the collars which surround the shaft $N^5$ which also extends through the various plates $N^{52}$ and $52^N$. The only difference between the pieces $N^{52}$ and $52^N$ is that the end members $N^{52}$ are made somewhat heavier and the pieces $52^N$ are shortened so that they do not extend down so far as to take in the hole for connecting the stud pivots $N^{10}$. The shaft $N^5$ is threaded at each end where it passes through the plates $N^{52}$ and when the adding wheels $N^{50}$ are mounted, suitable nuts are screwed on the ends of the shaft $N^5$, and on being tightened form the combination of parts into a frame which is reasonably rigid and this frame as a whole swings about the pivots $N^{10}$ in the plates $53^N$, see Fig. 32.

The shaft $N^2$ extends through the side plates $N^{52}$ at each end and terminates in a small roller $N^{30}$, see Fig. 14, which roller enters the slot in a cam $N^{58}$ mounted upon the shaft $N^1$. The slot in the cam $N^{58}$ is of such design that the partial rotation of $N^{58}$ with shaft $N^1$ will cause the roller, $N^{30}$ and consequently the shaft $N^2$ to advance to or recede from the shaft $N^1$ and the position of the shaft $N^1$ is such that as this cam $N^{58}$ is operated it moves the shaft $N^2$ so as to cause the adding wheels $N^{50}$ to engage and disengage the teeth of the rack $R^{50}$.

Mounted in the wheel frame consisting of the parts just described and upon a shaft $N^3$ which extends through the various plates $N^{52}$ and $52^N$ are a series of hooks, $N^{60}$ and $N^{61}$, whose points come into the plane of the two pointed cam $N^{51}$ secured to each of the wheels $N^{50}$. The shape of these two hooks $N^{60}$ and $N^{61}$ is clearly shown in Figs. 34 and 36. They are in each case provided with a spring $N^{86}$ so arranged that its tension causes the two points of the hooks to tend to move toward the center of the cam $N^{51}$. The shape of the point of the hook, $N^{60}$ is such that in rotating the cam $N^{51}$ in a direction so that it strikes the point of the hook $N^{60}$ while moving in a direction toward the shaft $N^3$, the hook $N^{60}$ will rise up and the point of the cam $N^{51}$ will pass underneath it. On the other hand if the rotation of the cam $N^{51}$ is in the reverse direction so that it engages the hook $N^{60}$ in a direction moving from the shaft $N^3$, the cam $N^{51}$ will stop against the inside of the hook $N^{60}$.

*The detent segment.*—The small three toothed segment $N^{54}$ is pivoted at $N^{16}$, see Fig. 11, to each of the plates $N^{53}$. This segment $N^{54}$ has extending outward from one side of it a pin, $N^{13}$ and the position of the teeth of the segment $N^{54}$ is such that as the wheel $N^{50}$ is disengaged from the teeth of the rack $R^{50}$ it at once engages the teeth of the segment $N^{54}$ and when in full engagement with the segment $N^{54}$, the teeth of the wheel $N^{50}$ just clear the teeth of the rack $R^{50}$.

To maintain the position of the segment $N^{54}$ there is provided two irregular shaped cams $N^{55}$ and $N^{56}$, the exact form of which is clearly shown in Figs. 35 and 37. These cams $N^{55}$ and $N^{56}$ are pivoted to the plates $N^{53}$ at $N^{15}$ and the upper extending arm of each cam is provided with an eccentric and somewhat irregular shaped slot which embraces pin $N^{13}$. The slot in the cam $N^{55}$ is so arranged that its rotation about its center $N^{15}$ will cause the pin $N^{13}$ to move the segment $N^{54}$ toward the right in Figs. 10 to 30, while the slot in the cam $N^{56}$ is so designed that a rotation of the cam $N^{56}$ about its center $N^{15}$ would cause the pin $N^{30}$ to rotate the tooth segment $N^{54}$ in a reverse direction, to the left, in the aforesaid figures. When both of the cams $N^{55}$ and $N^{56}$ are in their uppermost position the shape of the slots at their lower ends is such as to hold pin $N^{13}$ in a central position, that is, in a position from which it can be moved in either direction a distance corresponding to one tooth on the segment $N^{54}$ when one or the other, $N^{55}$, $N^{56}$, is released by $N^{51}$. These two cams $N^{55}$ and $N^{56}$ are held in their upper position by the turned over ends of the hooks $N^{60}$ and $N^{61}$ which are respectively marked W and Y. The turned over end W on the hook $N^{60}$ engages the cam $N^{55}$ on the part marked X, see Figs. 34–37, while the turned over end marked Y on hook $N^{61}$ engages the part marked Z on the cam $N^{56}$. A suitable spring $N^{87}$ is provided for each of these cams $N^{55}$ and $N^{56}$ and tends to rotate them so that their upper end shall move in a downward direction and consequently to move it against the latched-up position which is maintained by the hooks $N^{60}$ and $N^{61}$.

*The carrying bar.*—The horizontal bar $N^{49}$ having upward extending arms at each end, is pivoted at $N^{11}$, see Figs. 13 and 31, to the side frames $N^{45}$. The bar $N^{49}$ is normally held in its retracted position by a spring $N^{85}$ and is stopped by the collar on the shaft $N^4$. The pin, $N^{12}$, see Figs. 13 and 31, serves as a means for swinging the bar $N^{49}$ about its pivots, $N^{11}$. The function of the bar $N^{49}$ is to restore the cams $N^{55}$ and $N^{56}$ to their latched position by means of the hooks $N^{60}$ and $N^{61}$ after the cams $N^{55}$ and $N^{56}$ have been unlatched in the process of carrying.

*The shift bar.*—Extending between the side frames $N^{45}$ and through the one on the left-hand side, there is an irregular shaped bar, $N^{90}$, the function of which is to block the action of one of the hooks $N^{60}$ and $N^{61}$ and at the same time, to block the action of one of the cams $N^{55}$ and $N^{56}$, as will be clearly seen by an examination of Figs. 10 and 12, and also of the Figs. 34–37. In Fig. 10, the upper projecting ridge on the bar $N^{90}$ engages the part marked $d$, Fig. 37 on the cam $N^{56}$ and so would prevent the cam $N^{56}$ from rotating about its center $N^{15}$ and so moving the pin $N^{13}$ on the segment $N^{54}$; at the same time the lower projecting edge of the bar $N^{90}$ has engaged the projection $(b)$ on the hook $N^{61}$ and has so moved the hook $N^{61}$ as to take its point clear of the path of travel of the points of the cam $N^{51}$, so that in this position of the bar $N^{90}$ the hook $N^{61}$ and the cam $N^{56}$ are totally inoperative as shown in Fig. 10. In Fig. 12 the bar $N^{90}$ has been rotated through a limited angle and this upper projecting edge has come in contact with the projection C (Fig. 35) on the cam $N^{55}$, and the lower edge of $N^{90}$, with A, on the hook, $N^{60}$ and has moved the hook $N^{60}$ so that its point has passed out from the path of travel of the cam $N^{51}$ and the hook $N^{60}$ and the cam $N^{55}$ are rendered inoperative.

With the above description of the separate parts and their mode of operation we will now consider the means for causing the machine to add.

*The operation of addition.*—Referring to Fig. 10, the parts will be found in their relative position at the time that the handle $O^{58}$ is in its normal position as shown in Fig. 1, in which position certain of the numeral keys $K^{51-59}$, are depressed. The handle $O^{58}$ is now drawn forward, which is to the left in Fig. 1, and the rack $R^{50}$ moves to the right as in Fig. 15. After the rack $R^{50}$ has moved, the shaft $N^1$, is rotated and the wheel $N^{50}$ is caused to engage with the teeth of the rack $R^{50}$, the engagement of the wheel $N^{50}$ with the teeth of the rack $R^{50}$ being caused by the movement of the cam $N^{58}$ to the position shown in Fig. 18. At this position of the cam $N^{58}$ the handle, $O^{58}$ has not quite concluded its forward stroke and the full stroke ratchet $O^{91}$ has not completed its travel in the tooth segment, $O^{67}$, see Fig. 1, to the last notch in which it reverses itself for the return stroke of the handle $O^{58}$. At this position of the cam, $N^{58}$ the carrying bar $N^{49}$ has been swung to its extreme forward position by means of the mechanism clearly shown in Figs. 13, 17, 21 and 25. This mechanism operates as follows: On the end of the shaft $N^1$, there is a crank, $N^{67}$ which serves for rotating it. The lower end of this crank $N^{67}$ has on it a roller $N^{29}$ which roller, $N^{29}$ engages an irregular shaped cam piece $N^{63}$. This cam has an upward extending horn on the right-hand side, Figs. 13 and 17, and when $N^{67}$ is moved from position shown in Fig. 13, to the position shown in Fig. 17, this upward extending horn engages the roller on the end of the piece $N^{65}$, which is pivotaly connected to the carrying bar $N^{49}$ and moves the bar $N^{49}$ to its extreme forward position as shown in Figs. 15, 16 and 17. In this extreme forward position the bar $N^{49}$ will cause the cams $N^{55}$ and $N^{56}$ to be rotated until the parts X and Z engage the turned over ends Y and W of the hooks $N^{60}$ and $N^{61}$. The further forward motion of the handle $O^{58}$ to its extreme limit in a forward direction moves the cam $N^{58}$ to the position shown in Fig. 22, but this motion from the position shown in Fig. 18, to the position shown in Fig. 22 of the cam $N^{58}$ does not change the position of the shaft $N^2$, in relation to the shaft $N^1$ because this portion of the slot in the cam $N^{58}$ is concentric with the shaft $N^1$. In this position of the parts shown in Fig. 21, the piece $N^{65}$ has this roller pass over the upper end of the irregular cam $N^{63}$ and the pin $N^{12}$ extending from the side of the carrying bar $N^{49}$ is dropped back until it engages the hook $N^{62}$ and the carying bar $N^{49}$ is retracted from its contact from the cams $N^{55}$ and $N^{56}$, leaving a slight gap, G, see Figs. 19 and 20, between the carrying bar and the aforesaid cams. The handle $O^{58}$ now returns to its normal position and in so doing rotates the wheel $N^{50}$, while the racks $R^{50}$ are returned to their normal position. In Fig. 19, the rack $R^{50}$ is within one tooth of its restored position and the cam $N^{51}$ is in a position just before engaging the hook, $N^{60}$. Just before the handle, $O^{58}$ reaches its normal position as shown in Fig. 1, the parts will assume position shown in Figs. 23, 25 and 26. In this position it will be observed that the cam $N^{51}$ has passed the point of the hook, $N^{60}$ and raised the same causing the lower end of the hook at W to disengage from the part X of the cam $N^{55}$ and the cam $N^{55}$ to drop back through the impulse of the spring $N^{87}$ until its lower end contacts with the carrying bar $N^{49}$. The last portion of the return stroke of the handle $O^{58}$ causes the return of the shaft $N^1$ to its normal position as shown in Figs. 14 and 30, causing the cam $N^{58}$ to raise wheels $N^{50}$ out of engagement with the teeth of the rack $R^{50}$ and engage the teeth of the segment $N^{54}$, after which there is a slight movement of the roller $N^{29}$ on the end of the crank $N^{67}$, which engages the upward extending arm of the hook, $N^{62}$ and causes the hook $N^{62}$ to disengage the pin $N^{12}$ on the carrying bar $N^{49}$ and the carrying bar $N^{49}$ through the influence of the spring $N^{58}$ is moved to the position shown in Fig. 27, and the cam $N^{55}$ is moved to follow it through the influence of the spring $N^{87}$, thereby moving to its lowered position and causing its cam slot to move the pin $N^{13}$ in such a direction as to cause the adjacent wheel $N^{50}$ to rotate a distance of one tooth in the same direction which the wheel has been rotated by the return of the racks $R^{50}$. On the next forward stroke of the handle $O^{58}$ the wheels $N^{50}$ will be depressed in the teeth of the rack, $R^{50}$ as before and near the end of the forward stroke of the handle, $O^{58}$, the carrying bar $N^{49}$ will move forward and relatch the cam $N^{55}$ on the hook $N^{60}$. This relatching will take place while the wheel $N^{50}$ is in engagement with the teeth of the rack $R^{50}$.

*The operation of subtraction.*—The relative position of the parts in the act of subtraction are clearly shown in sequence of figures beginning with Figs. 12, 16, 20, 24 and ending with Fig. 28. In Fig. 12, it will be seen that the bar $N^{90}$ has been turned from the position shown in Fig. 10 and that the upper projection on this bar is now in contact with the cam $N^{55}$ at $c$, Fig. 35 and the lower projection of the bar $N^{90}$ is in contact with the upward projection $a$ on the hook, $N^{60}$ and that $N^{60}$ and $N^{55}$ are consequently rendered inoperative.

When subtraction is to take place in this machine, the wheel $N^{50}$ is caused to engage with the teeth of the rack, $R^{50}$ before the rack $R^{50}$ has been moved. The travel of the rack $R^{50}$ being limited by the depression of the keys $K^{51}$–$K^{59}$ on the key board or otherwise. The wheel $N^{50}$ will be rotated in the reverse direction from that of adding and it will reverse itself as many teeth as the rack $R^{50}$ moves toward the rear of the machine and consequently as many teeth as the figure on the key stem which limits the travel of the rack $R^{50}$. In Fig. 12 the parts are shown with the handle $O^{58}$ in its normal position of rest. In Fig. 20, the handle has advanced, the wheels $N^{50}$ have been depressed into the teeth of rack $R^{50}$ and the rack $R^{50}$ has advanced until the cam $N^{51}$ has come into position to engage with the point of the hook $N^{61}$. In Fig. 24, the handle $O^{58}$ has reached its extreme forward position and the rack $R^{50}$ has advanced the cam $N^{51}$ still farther and it has passed the point of the hook $N^{61}$, depressing the same and causing the other end, Y, of the hook $N^{61}$ to disengage from the part Z of the cam $N^{56}$, permitting the cam $N^{56}$ to swing downward under the influence of the spring $N^{87}$ until it comes in contact with the carrying bar $N^{49}$. This distance, however, is not sufficient to cause the cam $N^{56}$ to move the pin $N^{13}$ and the segment $N^{54}$. In Fig. 28 the handle, $O^{58}$ has returned to its normal position, the carrying bar $N^{49}$ has been released by the hook $N^{62}$ and has retracted to its rear position and the cam $N^{56}$ has descended to its lower position, this lower end following the movement of the carrying bar $N^{49}$. The slot in its upper end which engages the pin $N^{13}$ moves the segment $N^{54}$ in a forward direction one tooth and causes the adjacent adding wheel $N^{50}$, to the left, to be moved through a distance of one tooth in the direction which the wheels $N^{50}$ move when subtraction takes place. On the next forward stroke of the handle the carrying bar $N^{49}$ is moved forward at the end of the forward stroke of the handle, $O^{58}$ and relatches the cam $N^{56}$ and the hook $N^{61}$.

*Taking a total.*—In the taking of a total the mechanism is in the same relative position as shown in Figs. 10, 15, 19, and 27, but the action of the adding wheels $N^{50}$ takes place in the same period of time that is employed in subtraction, that is, the wheels $N^{50}$ are caused to engage the racks $R^{50}$ prior to the movement of the racks $R^{50}$ to the rear and this movement of the racks $R^{50}$ reverses the direction of rotation of the adding wheels $N^{50}$ the same as in subtraction until the cam $N^{51}$ abuts against the inside of the hook $N^{60}$ at which place it will stop and arrest further action of the rack $R^{50}$. It will consequently permit the rack $R^{50}$ to move as many teeth as there are units accumulated from this starting position of the wheels, $N^{50}$.

If the wheels are to be cleared and made ready for a new addition the wheels are lifted out of engagement with racks $R^{50}$ before the racks begin their return stroke. If, on the other hand, it is desired to retain the total in the machine and add to it, the racks $R^{50}$ are returned to the starting point before the wheels $N^{50}$ are raised out of engagement with it.

*The adding key and the carriage connection thereto.*—Inasmuch as this machine is normally disengaged from the accumulator and requires some positive movement of the mechanism to engage the accumulator with the actuator and printing devices, that mechanism will now be described.

Referring to Figs. 3 and 4, it will be seen that the crank $N^{67}$ which operates the shaft $N^1$ for causing the accumulator adding wheels to engage and disengage from the rack $R^{50}$, is connected by the link $D^{56}$ to the upper end of the flying lever $D^{53}$, which flying lever is pivotally mounted upon the plate $D^{50}$ secured to the shaft $O^1$. Mounted on the pivot which secures the link $D^{56}$ to the flying lever $D^{53}$ is an abutting cam $D^{51}$ which is held in its proper place by a small spring, and is capable of rotation about this same pivot. In its normal position the piece $D^{51}$ will contact with the stud $D^{12}$ as shown in Fig. 4, when the plate $D^{50}$ has completed about three-quarters of its forward movement, and when $D^{51}$ contacts with $D^{12}$, the combination of the plate $D^{50}$, the flying lever $D^{53}$ and the abutting cam $D^{51}$ form a solid crank from the shaft $O^1$ to the link $D^{56}$, and the further movement of the shaft $O^1$ rotating the plate $D^{50}$ will cause the link $D^{56}$ to swing the crank $N^{67}$ from the position shown in Fig. 3, to the position shown in Fig. 4, and this would take place in the proper time for causing the function of addition. There is, however, another train of mechanism which normally prevents the abutting cam $D^{15}$ from engaging the stud $D^{12}$. This mechanism consists of the piece $D^{58}$ pivoted about its middle to the side frame, the upper end of the piece $D^{58}$ carrying the projecting pin $D^{15}$. This pin $D^{15}$ is held in its upward position as shown in Fig. 3, by a link $D^{66}$ which is pivoted at its lower end to the piece $D^{67}$, which in turn is pivoted to the side frame. The other end of the piece $D^{67}$ is in the path of travel of the plate $D^{50}$, and when $D^{50}$ is in the position shown in Fig. 3, the link $D^{66}$ raises the pin $D^{15}$ and moves the lower end of the piece $D^{58}$ so that it is latched in this raised position by the piece $D^{60}$. When the pin $D^{15}$ is in this elevated position as shown in Fig. 3, the upper end of the abutting cam $D^{51}$ would engage the pin $D^{15}$ when the plate $D^{50}$ is rotated with the shaft $O^1$ and this would cause the lower end of the abutting cam $D^{51}$ to miss the square stud $D^{12}$ and the consequence would be that the rotation of the shaft $O^1$ and the plate $D^{50}$ would in no way affect or move the crank $N^{67}$. To permit the pin $D^{15}$ on the piece $D^{58}$ to begin descent and be out of the way of the upper end of the abutting cam $D^{51}$, it is only necessary to elevate the forward end of the trigger piece $D^{60}$, and this is done by two separate means. One is a link $D^{64}$ which is positively raised by a suitable projection on the carriage of the machine, the mechanism not being shown. The other means being the latch $L^{57}$ for the adding key $K^{65}$. This latch $L^{57}$ is pivoted in the side frame of the machine, its lower end terminating in a suitable pin for engaging the end of the trigger $D^{60}$, and its upper end actuated by a suitable spring, engages a notch in the back side of the key stem of $K^{65}$ and when the latch $L^{57}$ engages this notch, it raises the forward end of the trigger, $D^{60}$ which permits the pin $D^{15}$ to descend when the plate $D^{50}$ moves and permits the piece $D^{67}$ to follow it.

No mechanism is shown for operating the trigger $D^{60}$ and its connecting link $D^{64}$ from the carriage, as this can be arranged in any suitable way depending upon the circumstances and design of the particular machine in which this mechanism is employed.

The operation of this mechanism is as follows: The handle $O^{58}$ is operated which causes the shaft $O^1$ to rotate in a clock-wise direction on Fig. 3, through an angle of about sixty degrees. When the plate $D^{50}$ has moved through an angle of about forty-five degrees, the abutting cam $D^{51}$ engages the stud $D^{12}$ on the plate $D^{50}$ which forms a rigid connection to the link $D^{56}$, and the further movement of the shaft $O^1$ rotates the crank $N^{67}$ to the position shown in Fig. 4, in which position it is maintained by the spring detent $N^{69}$. On the return stroke of the handle $O^{58}$ the plate $D^{50}$ moves to the left in Fig. 4 and the link $D^{56}$ and flying lever $D^{53}$ move about their respective centers and the pivot connecting the two of them together, the crank $N^{67}$ remaining stationary until the square stud $D^{13}$ engages the forward side of the flying lever $D^{53}$ and this engagement takes place when the plate $D^{50}$ has moved through an angle of about forty-five degrees of its return stroke. The stud $D^{13}$ engages the forward side of the flying lever $D^{53}$ and the remaining degrees of travel of plate $D^{50}$ causes the flying lever $D^{53}$ to push the connecting link $D^{56}$ and so swing the crank $N^{67}$ from the position shown in Fig. 4 to the position shown in Fig. 3, and this motion of the crank $N^{67}$ takes place after the racks $R^{50}$ have been restored to their normal position.

*The total and sub-total keys.*—The taking of a total or sub-total on this machine is accomplished by the depression of one of two keys, which two keys are altogether similar in their action, with the exception that the total key is not released to become inoperative until near the end of the return stroke of the handle $O^{58}$, while in case of a sub-total the key is released near the end of the forward stroke of the handle $O^{58}$. The operation of this mechanism can be clearly seen in Figs. 3 and 4. The key $K^{64}$ is a sub-total key. On being depressed it will become latched down by the engagement of the piece $55^L$ with the notch in the back side of the key stem of $K^{64}$. This latch $55^L$ is pivoted about the same center with the piece $L^{56}$ and flexibly connected thereto by a suitable spring which permits $L^{56}$ to rotate in a clock-wise direction against the tension of the spring, and causes $L^{56}$ to move in the same direction whenever the latch $55^L$ engages the key stem of $K^{64}$. This movement of the piece $L^{56}$ from the position shown in Fig. 3 to the position shown in Fig. 4 depresses the piece $58^L$ by means of the cam on its upper edge, the piece $58^L$ being pivoted about the same center with the piece $60^L$, and connected thereto by a suitable spring. When the piece $60^L$ is raised to the position as shown in Fig. 4, the left hand end of the piece $60^L$ will come into the path of the small roller on the lower end of the flying lever $D^{53}$ and form an obstacle to the movement of the said roller on the end of the flying lever $D^{53}$ Pivoted on the piece $60^L$ is a piece $L^{62}$ which is held in the position shown by a suitable spring.

When a total is to be taken the total key, which corresponds to the key $K^{64}$, is depressed and the piece $60^L$ and the piece $L^{62}$ at once assume the position shown in Fig. 4. The rotation of the shaft $O^1$ with the plate $D^{50}$ causes the flying lever to engage the piece $60^L$ with its lower end and roller, and the first fifteen degrees of the motion of the plate $D^{50}$ causes the flying lever $D^{53}$ and link $D^{56}$ to move the crank $N^{67}$ from the position shown in Fig. 3 to the position shown in Fig. 4, at which point the roller on the lower end of the flying lever $D^{53}$ passes over the upper point of the piece $60^L$ and moves to the position shown in Fig. 4, depressing the piece $L^{62}$ in the latter part of its motion until it has passed the same, as shown in Fig. 4, the spring restoring the piece $L^{62}$ to the position shown. On the return stroke of the handle $O^{58}$, the shaft $O^1$ and plate $D^{50}$ move in the opposite direction and the roller on the lower end of the flying lever $D^{53}$ engages the piece $L^{62}$ which piece $L^{62}$ forms a positive obstruction to the movement of the flying lever $D^{53}$, which causes the flying lever $D^{53}$ to move the link $D^{56}$ and so restore the crank $N^{67}$ from the position shown in Fig. 4 to the position shown in Fig. 3, which motion takes place in the first fifteen degrees of motion of the return stroke of the plate $D^{50}$, after which the flying lever $D^{53}$ and the link $D^{56}$ swing about their respective centers until they assume the position shown in Fig. 3.

The release of the total key is effected as follows: There is a sliding part $L^{66}$ which moves substantially horizontally. This part has certain vertical projections into the path of the turned over end of the latch $55^L$. The rear end of this piece $L^{66}$ carries a pivoted piece $L^{67}$ maintained in its vertical position by any suitable spring. Its upper end is in position to contact with a pin $L^{29}$ and its lower end is in the path of travel of a stud $D^{14}$ on the back side of the plate $D^{50}$. On the forward stroke of the handle and the plate $D^{50}$, the stud $D^{14}$ passes underneath the piece $L^{67}$, swinging $L^{67}$ out of its path in order to do so. On the return stroke of the handle $O^{58}$ the stud $D^{14}$ engages the lower end of the piece $L^{67}$, the upper end of $L^{67}$ contacts with the pin $L^{29}$ and the further movement of the stud $D^{14}$ moves the piece $L^{66}$ to the left and so disengages the latch $55^L$ from the notch in the key stem of $K^{64}$ and permits the key stem to assume its normal position. This action also restores the piece $L^{66}$ from the position shown in Fig. 4 to the position shown in Fig. 3 and permits the piece $60^L$ to drop to the position shown in Fig. 3, in which position both $60^L$ and the piece $L^{62}$ are out of the path of travel of the lower end of the flying lever $D^{53}$. There is a similar piece to $L^{66}$ mounted to slide in the same manner on the same studs and the rear end of this second sliding part is connected to the vertical pivoted piece $L^{68}$, the lower end of which extends into the path of a projecting end of the pivot of the flying lever $D^{53}$ which extends through to the back side of the plate $D^{50}$, consequently when the plate $D^{50}$ is in the position shown in Fig. 4, this piece $L^{68}$ has moved its sliding part $L^{66}$ into the position to release the latch of the sub- total key $K^{64}$, which would permit the piece $L^{60}$ to drop to the position shown in Fig. 3 and the return motion of the plate $D^{50}$ would restore the adding crank $N^{67}$ in exactly the same time and manner as is done in case of addition, i. e., the adding crank $N^{67}$ would remain in the position shown in Fig. 4 during the first forty-five degrees of the return motion of the plate $D^{50}$ at which time the stud $D^{13}$ would contact with the forward side of the flying lever $D^{53}$ and so restore the adding crank $N^{67}$ at the end of the return stroke of the handle $O^{58}$.

*The subtraction key.*—The subtraction key $K^{70}$ is placed to one side of the total key and its depression serves to rock the small shaft upon which is mounted the piece $L^{70}$ from the position shown in Fig. 3 to the position shown in Fig. 4. When this piece $L^{70}$ is so moved, it is latched in this position by the latch piece $L^{71}$ suitably pivoted to the side frame and maintained in its position by a proper spring. The latch piece $L^{71}$ has an upward extending arm which engages a small pin $L^{13}$ mounted on the sliding bar $L^{66}$ so that on the return stroke of the handle $O^{58}$ the movement of the bar $L^{66}$ will release the subtracting key $L^{70}$. When the key $K^{70}$ is depressed and the piece $L^{70}$ has moved to the position shown in Fig. 4 the stud $L^{14}$ in its rearward extending arm engages and moves the piece $L^{56}$ to the position shown in Fig. 4, thus raising the piece $L^{60}$ into its operative position. The lower end of the piece $L^{70}$ engages the long link $L^{93}$ whose rear end is connected by a suitable spring $L^{88}$ to the stud on the end of the crank $N^{64}$ which is mounted on the shift bar $N^{90}$, shown in the sections Figs. 10, 12, etc., and has, when the key $K^{70}$ is depressed, a tendency to rotate this shift bar $N^{90}$ from the position shown in Fig 10, the position for addition, to the position shown in Fig. 12, the position for subtraction.

Inasmuch as the cam $N^{56}$, Fig. 10, is held in contact with the bar $N^{90}$ by its spring $N^{87}$, it is evident that the bar $N^{90}$ is not free to move, but is retarded by the friction against the cam $N^{56}$. This friction, however, is released and removed at that period of the handle stroke in which the carrying bar $N^{49}$ assumes the position shown in Fig. 16, at which time the shift bar $N^{90}$ is free to move and will move under the impulse of the spring $L^{88}$.

A suitable spring is provided for returning the crank $N^{64}$ and the shift bar $N^{90}$ to their normal position when the subtraction key $K^{70}$ has been released.

The operation of subtraction is as follows: The subtraction key $K^{70}$ is depressed which, through its train of mechanism, puts a tension on the spring $L^{88}$ tending to turn the crank $N^{64}$ and the shift bar $N^{90}$ to the subtracting position. The piece $L^{56}$ raises the piece $60^L$ and $L^{62}$ into the position shown in Fig. 4 and the operation of the handle $O^{58}$ causes the movement of the adding crank $N^{67}$ during the first fifteen degrees of operation of the handle stroke which permits the shift bar $N^{90}$ to assume the subtracting position and the racks $R^{50}$ move backward until stopped by the studs $K^{23}$ on the stems of the numeral keys which have been depressed.
This rotates the adding wheels $A^{50}$ in a backward direction from addition, a number of teeth corresponding to the number of the numeral keys depressed. If, in this backward rotation, the adding wheels $A^{50}$ cause the cams $N^{51}$ to pass the hooks $N^{61}$ and trip the carrying mechanism, the adjacent wheel $N^{50}$ to the left will move one tooth in a reverse direction to addition when the wheels $N^{50}$ are raised out of engagement with the racks $R^{50}$ and into engagement with the carrying segment $N^{54}$.

*Subtracting the total or sub-total of one accumulator from the amount added in the other accumulator.*—For the purpose of subtraction it is quite immaterial what limits the travel of the rack $R^{50}$, and referring to Fig. 2, if one of the accumulators is engaged for the purpose of giving a total or sub-total while the other accumulator is engaged for the purpose of subtraction, it is evident that the accumulator which is set for giving a total or sub-total will limit the travel of the rack $R^{50}$ and that the rack $R^{50}$ will consequently subtract this amount from the opposite accumulator, and it is quite immaterial whether it be the upper or the lower accumulator which is set for the total or sub-total, and equally immaterial which accumulator is set for subtraction;
though it is of course possible to construct the machine, and it may often be desirable to do so, with one accumulator made for both addition and subtraction, while the other accumulator is made only for the purpose of addition. It is also evident that if the arrangement shown in Fig. 2 should be duplicated, *i. e.*, that the rack $R^{50}$ should extend between the upper and lower accumulator and two more accumulators similarly located should be placed behind them, that it would be possible to limit the travel of the rack $R^{50}$ by taking the total or sub-total upon any one of the four accumulators and causing this amount to be added into or subtracted from any or all of the other three accumulators.

*The release of the numeral keys.*—The numeral keys, $K^{51}$ to $K^{59}$, Fig. 2, are maintained in their depressed position by a shutter latch extending lengthwise of the key board and engaging all nine keys, and there is a similar latch for each column of keys. These various latches are swung to the left in the machine by the transverse movement of a bar $66^K$, Fig. 2, and Fig. 9, which bar $66^K$ engages a bell crank $L^{53}$ which in turn is operated by a longitudinal sliding bar $L^{51}$, see Figs. 7 and 8.

In addition the numeral keys are released on the return stroke of the handle $O^{58}$, consequently the return stroke of the shaft $O^1$, and this is accomplished in the following manner, see Figs. 7 and 8. Mounted on the shaft $O^1$ is a suitable plate $D^{55}$ near the upper side of which is a roller $D^{30}$. As the shaft $O^1$ is turned in its forward direction the roller $D^{30}$ moves to the right in Fig. 7 which permits the hook $L^{63}$ to engage the roller $D^{30}$. On the return stroke of the handle $O^{58}$ and the shaft $O^1$, the roller $D^{30}$ engaging the hook $L^{63}$ which is pivoted on the sliding bar $L^{51}$, draws the sliding bar $L^{51}$ toward the rear of the machine and so operates the crank $L^{53}$ and the transverse bar $66^K$ releasing the numeral keys. The upward extending arm of the hook $L^{63}$ engages a stud $L^{35}$ at a suitable time to release the hook $L^{63}$ from the roller $D^{30}$ and permits the sliding bar $L^{51}$ and its connections to the transverse sliding bar $66^K$ to resume their normal position.

The release of the numeral keys when subtraction takes place is done in the same time and by the same mechanism that releases the numeral keys in addition.

When a total or sub-total is to be taken it is necessary to release the numeral keys during the first fifteen degrees of the forward stroke of the handle $O^{58}$ and this is accomplished in the following manner, see Figs. 7 and 8. The total and sub-total keys $K^{64}$ abut at their lower end against a diagonally sliding piece $L^{52}$ which sliding piece has a turned over lip near its rear upper edge which engages a stud $L^{11}$ on the lower edge of the irregular shaped piece $L^{61}$. This piece $L^{61}$ is pivoted to the lower end of the latch $L^{55}$ for the repeat key $K^{62}$ and is held in its upper position by a suitable spring. A second stud $L^{10}$ in the lower edge of the piece $L^{61}$ comes underneath a second hook $L^{64}$ pivoted on a downward extension from the piece $L^{51}$, and the hook $L^{64}$ and the hook $L^{63}$ are connected together by a suitable spring, tending to raise the hook $L^{64}$ and move the hook $L^{63}$ downward. The tension of the spring holding the piece $L^{61}$ in its upward position is strong enough, however, to cause these different parts to normally assume the position shown in Fig. 7.
When, however, a total or sub-total key, as $K^{64}$, is depressed it depresses the piece $L^{52}$ and carries down the piece $L^{61}$ which permits the spring to raise the hook $L^{64}$ until it comes into engagement with a roller $D^{31}$ on the lower end of a pivoted cam $D^{63}$ and this cam $D^{63}$ is in contact with a roller $D^{32}$ mounted on the plate $D^{55}$ secured to the shaft $O^1$. When the parts are in the position shown in Fig. 8, the initial movement of the shaft $O^1$ will cause the roller $D^{32}$ to swing the cam $D^{63}$ to the left in Fig. 8 and so move the hook $L^{64}$ and the piece $L^{51}$ to the left, thereby releasing the numeral keys.

*The repeat key.*—When the repeat key $K^{62}$ is depressed its latch $L^{55}$ moves the piece $L^{61}$ to the left in Fig. 7 and the left hand end of the piece $L^{61}$ has a pin projecting from it into the path of movement of the hook $L^{63}$, and this motion of the piece $L^{61}$ rotates the hook $L^{63}$ so that it will not engage the roller $D^{30}$, in this way permitting the same number set up on the numeral keys to be added as often as desired.

It is also evident, though not shown in the drawing, that the subtraction key can be provided with a suitable latch for holding it in its depressed position, in which position a sub-total from the opposite accumulator could be subtracted as many times as the handle is operated or the given number may be set upon the numeral keys, and if the repeat key be also depressed, this amount could be subtracted as many times as the handle is operated.

It is also evident, though not shown in the drawings, that it would be perfectly feasible to connect the subtracting mechanism to a lever which would be operated from the position of the carriage, i. e., some suitable tabulating stop could be provided on the carriage which, in operating position, would move a mechanism or lever which would effect the same result in the machine as the depression of the subtracting key.

Having thus described my invention, what I claim as new and desire to secure by Letters Patent, is:—

1. In an adding and subtracting mechanism, the combination with accumulator wheels, of a reciprocating "carrying" detent adapted to move forward or backward constituting a single means adapted, on movement in one direction, to directly engage and turn an accumulator wheel of a higher order in a forward direction and, on movement in the other direction to turn the accumulator wheel in a backward direction, and means under the control of the accumulator wheels for positively shifting said detent in one direction or the other to effect "carrying" for either addition or subtraction.

2. In an adding and subtracting mechanism, the combination with accumulator wheels, of a reciprocatory "carrying" detent adapted to move forward or backward constituting a single means adapted, on movement in one direction, to directly engage and turn an accumulator wheel of a higher order in a forward direction and, on movement in the other direction to turn the accumulator wheel in a backward direction, and selectively settable means under the control of the accumulator wheels for positively shifting said detent in one direction or the other to effect "carrying" for either addition or subtraction.

3. In an adding and subtracting mechanism, the combination with accumulator wheels, of a "carrying" detent adapted to move forward or backward and, on movement in either direction, to turn an accumulator wheel of a higher order in a forward or backward direction, means for moving said detent comprising two mechanisms both controlled by a wheel of a lower order, one mechanism being adapted to move the detent in one direction and the other mechanism to move said detent in the opposite direction.

4. In an adding and subtracting mechanism, the combination with accumulator wheels, of a "carrying" detent adapted to move forward or backward, and on movement in either direction to turn an accumulator wheel of higher order in a forward or backward direction, means for moving said detent comprising two mechanisms both controlled by a wheel of a lower order, one mechanism being adapted to move the detent in one direction and the other mechanism to move said detent in the opposite direction, and means for selectively locking one of said mechanisms when rendering the other mechanism operative.

5. In an adding and subtracting mechanism, the combination with accumulator wheels, of "carrying" detents adapted to move forward or backward, according to whether addition or subtraction is to be performed, and selectively controlled operating means for said carrying detents, said operating means being adapted to determine the direction of movement of said detents when carrying and to lock said detents when they are not operated for carrying purposes, to thereby adapt said detents to lock the accumulator wheels.

6. In an adding and subtracting mechanism, the combination with actuators, of accumulator wheels movable into and out of engagement therewith, reciprocatory "carrying" detents, each adapted to move forward or backward, means under the control of wheels of lower orders adapted to positively operate the respective detents either in a forward or backward direction to cause them to directly engage and correspondingly turn wheels of higher order forwardly or backwardly when carrying, said means being also adapted to lock the detents however the latter may be disposed when they are not operated for carrying purposes, and said accumulator wheels being normally engaged with, and locked by, said detents, but disengaged therefrom when engaged with the actuators.

7. In an adding and subtracting mechanism, the combination with actuators, of accumulator wheels adapted to engage the actuators, adding and subtracting trip members respectively adapted to coöperate with an accumulator wheel of a lower order when said wheel is turning in one direction or the other, "carrying" devices respectively controlled by the trip members aforesaid and each adapted to effect carrying from a wheel of lower order to one of a higher order after its controlling trip member has been operated, and means for rendering inoperative one of said carrying devices and its controlling trip member when the other carrying device and its controlling trip member are free for operation.

8. In an adding and subtracting mechanism, the combination with actuators, of accumulator wheels adapted to engage the actuators, adding and subtracting trip members respectively adapted to coöperate with an accumulator wheel of a lower order when said wheel is turning in one direction or the other, "carrying" devices respectively controlled by the trip members aforesaid and each adapted to effect carrying from a wheel of lower order to one of a higher order after its controlling trip member has been operated, means for rendering one of said carrying devices inoperable by its trip member when the other carrying device is free for operation, and a movably mounted combined stop and restoring member coöperating with the carrying devices.

9. In an adding and subtracting mechanism, the combination with actuators, of accumulator wheels adapted to engage the actuators, adding and subtracting trip members respectively adapted to coöperate with an accumulator wheel of a lower order when said wheel is turning in one direction or the other, "carrying" devices respectively controlled by the trip members aforesaid, a detent adapted to engage a wheel of a higher order, each of said carrying devices being adapted to move the detent to effect carrying from a wheel of a lower order to one of a higher order, and means for rendering one of the carrying devices inoperable by its trip member when the other carrying device is free for operation.

10. In an adding and subtracting mechanism, the combination with actuators, of accumulator wheels adapted to engage the actuators, pivoted adding and subtracting hook-latches respectively adapted to coöperate with a wheel of a lower order when said wheel is turning in one direction or the other, pivoted "carrying" cam-plates respectively adapted to be latched by the pivoted adding and subtracting hook-latches, a movable detent adapted to engage a wheel of a higher order, the cam of both of said cam-plates coöperating with the detent and relatively arranged so that said cam-plates are individually adapted to move said detent in opposite directions to thereby turn the wheel of higher order in one direction or the other, and a settable selector adapted for rendering inoperative one of said cam-plates and its controlling hook-latch when the other cam-plate and hook-latch are free for operation.

11. In an adding and subtracting mechanism, the combination with actuators, of a movably mounted accumulator having wheels representing different orders, pivoted detents adapted to engage said wheels when they are out of engagement with said actuators, pivoted adding and subtracting hook-latches arranged in pairs the members of which are respectively adapted to coöperate with an accumulator wheel of a lower order when said wheel is turning in one direction or the other, pairs of pivoted "carrying" cam-plates respectively adapted to be latched by the pivoted adding and subtracting latches, the cams of said pairs of cam-plates coöperating with the respective detents and relatively arranged so that they normally lock the detents and hence lock the accumulator wheels when the latter are engaged with the detents, said cams also being relatively arranged so that the cam-plates of a given pair are individually adapted to move a detent in opposite directions to thereby turn an accumulator wheel of a higher order in one direction or the other, a settable selector adapted for rendering inoperative one of said cam-plates and its controlling hook-latch when the other cam-plate and hook-latch are free for operation, and a combined movable stop and restoring device for said cam-plates.

12. In an adding and subtracting mechanism, the combination with accumulator wheels, of two controlling mechanisms, one for addition and the other for subtraction, and a reciprocatory "carrying" device for each wheel common to, and under the control of, both controlling mechanisms aforesaid, whereby the same "carrying" device may be used for either addition or subtraction.

13. In an adding and subtracting mechanism, the combination with accumulator wheels, of two controlling mechanisms, one for addition and the other for subtraction. reciprocatory "carrying" detents for each wheel common to, and under the control of, both controlling mechanisms aforesaid, whereby the same "carrying" detents may be used for either addition or subtraction, and selective means for setting one controlling mechanism for operation while locking the other controlling mechanism against operation.

14. In an adding and subtracting mechanism, the combination with movably mounted accumulator wheels, of actuators with which said accumulator wheels may be engaged, two controlling mechanisms, one for addition and the other for subtraction, and "carrying" means for each wheel common to, and under the control of, both controlling mechanisms aforesaid, with which the accumulator wheels may be engaged when disengaged from the actuators, said carrying means being adapted, as controlled by whichever controlling mechanism is operative, to effect "carrying" in one direction or the other on the accumulator wheels when the latter are engaged therewith after being turned by the actuators.

15. In an adding and subtracting mechanism, the combination with movably mounted accumulator wheels, of actuators with which said accumulator wheels may be engaged, two controlling mechanisms, one for addition and the other for subtraction, and "carrying" means for each wheel common to, and under the control of, both controlling mechanisms aforesaid, with which the accumulator wheels may be engaged when disengaged from the actuators, said "carrying" means being adapted, as controlled by whichever controlling mechanism is operative, to effect "carrying" in one direction or the other on the accumulator wheels when the latter are engaged therewith after being turned by the actuators, and selective means for setting one controlling mechanism for operation while locking the other controlling mechanism against operation.

16. In an adding and subtracting mechanism, the combination with accumulator wheels and a movable frame in which they are mounted, of a trip member movably mounted on the accumulator wheel frame and adapted to coöperate with the accumulator wheels, a detent movably mounted independently of said accumulator movable wheel frame adapted to "carry" from a wheel of a lower order to a wheel of a higher order, and a shifting device for the detent mounted independently of the detent and independently of the accumulator wheel carrying frame and directly engageable with, and held by, the trip member.

17. In an adding and subtracting mechanism, the combination with accumulator wheels and a frame in which said wheels are mounted, of two trip members movably mounted on the wheel carrying frame and adapted to coöperate with the accumulator wheels, according to the direction of rotation of said wheels, a detent movably mounted independent of the wheel carrying frame and adapted to move both forwardly and backwardly, said detent adapted to "carry" from a wheel of a lower order to a wheel of a higher order, and two shifting devices respectively controlled by the respective trip members aforesaid and both mounted independent of the detent and of the wheel carrying frame and respectively adapted to cause movement of the detent forwardly or backwardly.

18. In an adding and subtracting mechanism, the combination with accumulator wheels, of a movably mounted detent adapted to coöperate with an accumulator wheel, and a combined shifting and locking member mounted independently of the detent and coöperating therewith to shift and to lock it positively, said shifting and locking member being subject to control by an accumulator wheel of a lower order.

19. In an adding and subtracting mechanism, the combination with accumulator wheels, of a pivoted swinging detent adapted to coöperate with an accumulator wheel to turn it in one direction or the other according as the detent is swung one way or the other, and a plurality of combined shifting and locking members mounted independently of the detent and coöperating therewith, said shifting and locking members being both subject to control by an accumulator wheel of a lower order.

In testimony whereof, I hereunto affix my signature in presence of two witnesses.

HALCOLM ELLIS.

Witnesses:
C. LOUISE SMITH,
NATHAN W. PERKINS, Jr.